United States Patent
Gafur et al.

(10) Patent No.: US 12,413,157 B2
(45) Date of Patent: Sep. 9, 2025

(54) CONTROLLING A MULTILEVEL POWER CONVERTER

(71) Applicant: Siemens Energy Global GmbH & Co. KG, Munich (DE)

(72) Inventors: Ilhom Gafur, Nuremberg (DE); Dominik Schuster, Diespeck (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 423 days.

(21) Appl. No.: 18/005,701

(22) PCT Filed: Jul. 17, 2020

(86) PCT No.: PCT/EP2020/070325
§ 371 (c)(1),
(2) Date: Jan. 17, 2023

(87) PCT Pub. No.: WO2022/012759
PCT Pub. Date: Jan. 20, 2022

(65) Prior Publication Data
US 2023/0283197 A1    Sep. 7, 2023

(51) Int. Cl.
*H02M 7/483*    (2007.01)
*H02M 1/084*    (2006.01)

(52) U.S. Cl.
CPC ......... *H02M 7/4835* (2021.05); *H02M 1/084* (2013.01)

(58) Field of Classification Search
CPC ..... H02M 1/084; H02M 7/483; H02M 7/4835
See application file for complete search history.

(56) References Cited

U.S. PATENT DOCUMENTS

| | | | |
|---|---|---|---|
| 8,233,300 B2* | 7/2012 | Dommaschk | H02M 7/4835 363/127 |
| 9,318,979 B2* | 4/2016 | Fischer | H02M 7/483 |
| 9,496,786 B2 | 11/2016 | Glinka | |
| 10,181,802 B2* | 1/2019 | Dommaschk | H02M 7/4835 |
| 10,248,148 B2* | 4/2019 | Dommaschk | H02M 7/4835 |
| 2010/0060235 A1* | 3/2010 | Dommaschk | H02M 7/4835 320/128 |
| 2014/0218986 A1* | 8/2014 | Hasler | H02J 3/26 363/123 |

(Continued)

FOREIGN PATENT DOCUMENTS

| | | |
|---|---|---|
| DE | 102011076199 A1 | 11/2012 |
| EP | 2958225 A2 | 12/2015 |
| JP | 2018137858 A | 8/2018 |

*Primary Examiner* — Gary A Nash
(74) *Attorney, Agent, or Firm* — Laurence A. Greenberg; Werner H. Stemer; Ralph E. Locher

(57) ABSTRACT

A method for controlling a modular multilevel power converter which has at least one phase module branch with a series circuit of modules. Each of the modules has an energy storage device and a power semiconductor circuit with electronic switching elements. A duty cycle of the phase module branch is ascertained, wherein the duty cycle describes the ratio between the voltage which is being output by the phase module branch and the voltage which can be maximally output by the phase module branch. The maximum value of the duty cycle during a preselected time period is ascertained, and the maximum value of the duty cycle is controlled to a target value for the maximum value of the duty cycle by a controller.

17 Claims, 7 Drawing Sheets

(56) References Cited

U.S. PATENT DOCUMENTS

| | | | |
|---|---|---|---|
| 2014/0226377 A1* | 8/2014 | Goetz | H02M 3/1582 |
| | | | 363/65 |
| 2015/0016828 A1 | 1/2015 | Swoboda | |
| 2017/0054294 A1 | 2/2017 | Lyn et al. | |
| 2018/0109202 A1* | 4/2018 | Marquardt | H02M 7/483 |
| 2020/0212818 A1 | 7/2020 | Kataoka et al. | |

* cited by examiner

CONTROLLING A MULTILEVEL POWER CONVERTER

SPECIFICATION

FIELD AND BACKGROUND OF THE INVENTION

The invention relates to a method for regulating a modular multilevel power converter and to an arrangement comprising a modular multilevel power converter.

Modular multilevel power converters have at least one phase module branch, wherein the phase module branch has a series circuit of two-pole modules. Such modules are also referred to as submodules. Each of these modules has an energy store and a power semiconductor circuit containing electronic switching elements. During operation of the multilevel power converter, the energy stores of the individual modules are each charged to a specific voltage. Driving the electronic switching elements of the individual modules appropriately makes it possible to switch the voltage of the energy store through to module terminals, as a result of which these modules then contribute to the (total) voltage provided by the multilevel power converter. Modules that contribute to the voltage provided by the multilevel power converter are also referred to as "switched-on modules".

During operation of the multilevel power converter, it is conceivable to regulate the multilevel power converter such that the energy stored in a phase module branch is always constant (energy regulation). The energy of the phase module branch is then thus kept at a constant setpoint value across all conceivable operating points by a corresponding regulator (energy regulator). This setpoint value (energy setpoint value) could then be dimensioned such that reliable, controllable operation of the multilevel power converter is still possible even at the least favorable conceivable operating point (worst-case operating point). In other words, even at this least favorable operating point, the phase module branch is charged to a sufficiently high energy. However, such a procedure has the disadvantage that, at many other operating points, the energy stored in the phase module branch is greater than it would have to be for these other operating points. In other words, at these other operating points, the energy stores of the individual modules are charged to an excessively high voltage. This in turn entails a number of disadvantages: Unnecessarily high electrical losses are thereby generated in the power converter, since the switching losses of the modules likewise become greater as the voltage of the energy store becomes greater. Furthermore, the components of the modules are loaded with an unnecessarily high voltage, thereby reducing their service life.

SUMMARY OF THE INVENTION

The invention is based on the object of specifying a method for regulating a modular multilevel power converter and an arrangement comprising a modular multilevel power converter, in both of which comparatively low electrical losses occur and the service life of the modules is comparatively high.

This object is achieved according to the invention by a method and by an arrangement as claimed in the independent patent claims. Advantageous refinements of the method and of the arrangement are indicated in the dependent patent claims.

What is disclosed is a method for regulating a modular multilevel power converter that has at least one phase module branch that has a series circuit of (two-pole) modules, wherein these modules each have an energy store and a power semiconductor circuit (connected in parallel with the energy store) containing electronic switching elements, wherein, in the method a degree of modulation of the phase module branch is ascertained, wherein the degree of modulation describes the ratio between the phase module branch voltage (currently being) output (or provided) by the phase module branch and the (current) maximum phase module branch voltage able to be output (or able to be provided), a maximum value of the degree of modulation during a preselected time interval is ascertained, and a regulation device is used to regulate the maximum value of the degree of modulation to a setpoint value for the maximum value of the degree of modulation.

The modular multilevel power converter may be able to be connected to an AC voltage grid and the preselected time interval may correspond to a period of the frequency of the AC voltage grid.

It is advantageous here for the maximum value of the degree of modulation of the phase module branch to be ascertained and for this maximum value of the degree of modulation to be regulated to a setpoint value. This achieves a situation whereby the energy stores of the modules of the phase module branch are charged on average only to the voltage that corresponds to the respective setpoint value. This achieves a situation whereby the maximum value of the degree of modulation essentially reaches the setpoint value during the preselected time interval, in particular in each period of the frequency of the AC voltage grid. Such a setpoint value for the maximum value of the degree of modulation may be for example 85%, but other setpoint values are of course also possible. In other words, the regulation achieves a situation whereby in each case only so much energy is stored in the modules of the phase module branch (or the energy stores of the phase module branch are charged only to such high voltages) that exactly the setpoint value for the maximum value of the degree of modulation is reached at the time of the maximum value of the degree of modulation. The maximum value of the degree of modulation is in this case typically present at a time during the period of the frequency of the AC voltage grid. This thus achieves a situation whereby the multilevel power converter is operated with the lowest possible voltage that is necessary for the maximum value of the degree of modulation to reach the setpoint value.

Advantageously, precisely no energy of the phase module branch is thus regulated (as with the energy regulation mentioned at the outset) and the abovementioned disadvantages are thereby avoided. No voltage of the phase module branch is regulated either. On the contrary, the maximum value of the degree of modulation is regulated to the setpoint value, in particular within a period of the frequency of the AC voltage grid.

The method may take place such that the degree of modulation is ascertained by ascertaining (for example measuring or using a voltage setpoint value) the phase module branch voltage output by the phase module branch and the voltages of the energy stores of the individual modules of the phase module branch, by summing the voltages of the energy stores of the individual modules of the phase module branch and then calculating a ratio between the phase module branch voltage and the sum of the voltages of the energy stores of the modules of the phase module branch, or by ascertaining the number of modules of the phase module branch in which the voltage of the respective energy store actively contributes to the phase module branch voltage, and then calculating a ratio between the determined number of modules and the total number of modules present in the phase module branch.

Advantageously, in particular only the intact modules of the phase module branch are taken into consideration in the total number.

The modules of the phase module branch in which the voltage of the respective energy store actively contributes to the phase module branch voltage are those modules in which the voltage of the respective energy store is switched onto both module terminals (the two poles of the two pole-modules) by way of the electronic switching elements. These modules are also referred to as "switched-on modules".

The degree of modulation may thus advantageously be determined in two different ways. On the one hand, the phase module branch voltage output by the phase module branch and the voltages of the energy stores of the individual modules of the phase module branch may be evaluated, and the degree of modulation may be ascertained therefrom. On the other hand, it is however also possible to correlate just the number of modules of the phase module branch whose voltage contributes to the phase module branch voltage (that is to say the number of switched-on modules) with the total number of (intact) modules present in the phase module branch. These numbers are generally known anyway during operation of the multilevel power converter. Advantageously, it is not necessary to evaluate the voltages of the energy stores of the individual modules for the second variant.

The method may also take place such that the maximum value of the degree of modulation is regulated to the setpoint value for the maximum value of the degree of modulation by driving the electronic switching elements of the modules of the phase module branch, in the event of an excessively high maximum value of the degree of modulation, such that the energy stores of the modules are charged on average to a higher voltage, as a result of which the maximum value of the degree of modulation drops, and/or by driving the electronic switching elements of the modules of the phase module branch, in the event of an excessively low maximum value of the degree of modulation, such that the energy stores of the modules are charged on average to a lower voltage, as a result of which the maximum value of the degree of modulation increases.

When the energy stores of the modules are charged on average to a higher voltage, then the phase module branch may provide a larger voltage, and so the degree of modulation and thus also the maximum value of the degree of modulation drops. The following also applies, vice versa: When the electronic switching elements of the modules of the phase module branch are driven such that the energy stores of the modules are charged on average to a lower voltage, then the phase module branch is able to provide only a lower voltage, as a result of which the degree of modulation and thus also the maximum value of the degree of modulation drops.

The method may also take place such that the maximum value of the degree of modulation is regulated to the setpoint value for the maximum value of the degree of modulation by converting the setpoint value for the maximum value of the degree of modulation into a setpoint energy amount for the modules of the phase module branch or into a setpoint sum of the voltages of the energy stores of the modules of the phase module branch, and driving the electronic switching elements of the modules such that the phase module branch is charged or discharged to the setpoint energy amount or the setpoint sum of the voltages of the energy stores of the modules.

This variant of the method is particularly advantageous when a multilevel power converter has been regulated up to present in a manner such that the setpoint energy amount for the modules of the phase module branch or the setpoint sum of the voltages of the energy stores of the modules of the phase module branch had each been regulated to a setpoint value (that is to say for example had been regulated to a constant setpoint value). Such a multilevel power converter is then able to be upgraded particularly easily for the method disclosed here, by making a degree of modulation controller superordinate to the energy (amount) regulator or voltage (sum) regulator that is already present in any case. The degree of modulation regulator then predefines the setpoint energy amount or the setpoint sum of the voltages in each case such that the maximum value of the degree of modulation is regulated to the setpoint value. This makes it possible in particular to reduce the losses of the previously energy-regulated or voltage-regulated multilevel power converter and to extend the service life of the modules.

The method may also take place such that a constant setpoint value is used for the maximum value of the degree of modulation or a setpoint value that is dependent on an operating point, formed from the phase module branch voltage and a phase module branch current, of the phase module branch is used for the maximum value of the degree of modulation. The setpoint value may in this case for example be read from a characteristic diagram or ascertained mathematically. Operation with a constant setpoint value is particularly simple, whereas, with an operating point-specific setpoint value, even more extensive loss reduction or service life extension is possible.

The method may also take place such that the phase module branch has surplus modules that are intended to replace modules that have failed during operation of the multilevel power converter, and these surplus modules are also (always) operational during operation of the multilevel power converter (and are not for instance bypassed, for example). This reduces the average voltage of the energy stores of the modules of the phase module branch. This applies in particular only as long as the surplus modules are not used due to an accordingly large number of modules of the phase module branch having already failed.

In this case, the surplus modules (which are also referred to as redundant modules) are advantageously likewise always put into operation during operation of the multilevel power converter. The total voltage stored in a phase module branch is thereby distributed among a larger number of modules, as a result of which the voltage per module is lower on average. This also reduces the electrical losses and/or increases the service life of the modules.

The method may also take place such that
a common maximum value of the degree of modulation during the preselected time interval is ascertained for multiple (in particular all) phase module branches of the multilevel power converter, and
the common maximum value of the degree of modulation is regulated to a setpoint value for the common maximum value of the degree of modulation by way of the regulation device.

In this case, in particular the highest maximum value of the maximum values of the respective phase module branches may be used as common maximum value. This regulation method is particularly easy to implement, because only one value (the common maximum value of the degree of modulation) needs to be regulated to a setpoint value. Although the achievable voltage reduction (and thus loss reduction or service life extension) is slightly lower in this variant of the method than if a separate maximum value were to be regulated to a separate setpoint value for each phase module branch, this variant also makes it possible to achieve a significant power loss reduction or service life extension.

The method may also be configured such that
a setpoint value for the maximum value of the degree of modulation that is less than the value 1 by a preselected safety margin is used. The value 1 corresponds to 100%. This safety margin ensures that the modular multilevel power converter remains controllable/regulatable, that is to say that the voltage generated by the modular multilevel power converter is able to be both increased and reduced as required.

What is also disclosed is an arrangement comprising a modular multilevel power converter that has at least one phase module branch that has a series circuit of (two-pole) modules, wherein these modules each have an energy store and a power semiconductor circuit (connected in parallel with the energy store) containing electronic switching elements,
comprising an ascertainment device that ascertains a degree of modulation of the phase module branch, wherein the degree of modulation describes the ratio between the phase module branch voltage (currently being) output (or provided) by the phase module branch and the (current) maximum phase module branch voltage able to be output (or able to be provided),
comprising a maximum value former that ascertains the maximum value of the degree of modulation during a preselected time interval, and
comprising a regulation device that is designed to regulate the maximum value of the degree of modulation to a setpoint value for the maximum value of the degree of modulation. The regulation device thus regulates the maximum value of the degree of modulation to the setpoint value for the maximum value of the degree of modulation.

The modular multilevel power converter may be able to be connected to an AC voltage grid and the preselected time interval may correspond to a period of the frequency of the AC voltage grid.

The arrangement may be implemented such that the ascertainment device is designed
to determine (for example measure or use a setpoint value) the phase module branch voltage output by the phase module branch and the voltages of the energy stores of the individual modules of the phase module branch, to sum the voltages of the energy stores of the individual modules of the phase module branch and to then calculate a ratio between the phase module branch voltage and the sum of the voltages of the energy stores of the modules of the phase module branch, or
to determine the number of modules of the phase module branch in which the voltage of the respective energy store actively contributes to the phase module branch voltage, and to then calculate a ratio between the determined number of modules and the total number of modules present in the phase module branch. In this case, the total number may preferably be the total number of intact modules present in the phase module branch, including any redundant modules that are present.

The arrangement may also be designed such that
the regulation device regulates the maximum value of the degree of modulation to the setpoint value for the maximum value of the degree of modulation by virtue of the regulation device initiating driving of the electronic switching elements of the modules of the phase module branch, in the event of an excessively high maximum value of the degree of modulation, such that the energy stores of the modules are charged on average to a higher voltage, as a result of which the maximum value of the degree of modulation drops, and/or by virtue of the regulation device initiating driving of the electronic switching elements of the modules of the phase module branch, in the event of an excessively low maximum value of the degree of modulation, such that the energy stores of the modules are charged on average to a lower voltage, as a result of which the maximum value of the degree of modulation increases.

The arrangement may be designed such that the regulation device regulates the maximum value of the degree of modulation to the setpoint value for the maximum value of the degree of modulation
by virtue of the regulation device converting the setpoint value for the maximum value of the degree of modulation into a setpoint energy amount for the modules of the phase module branch or a setpoint sum of the voltages of the energy stores of the modules of the phase module branch, and
by virtue of the regulation device initiating driving of the electronic switching elements of the modules such that the phase module branch is charged or discharged to the setpoint energy amount or the setpoint sum of the voltages of the energy stores of the modules.

The arrangement may also be designed such that
the regulation device uses a constant setpoint value for the maximum value of the degree of modulation or uses a setpoint value that is dependent on an operating point, formed from the phase module branch voltage and a phase module branch current, of the phase module branch for the maximum value of the degree of modulation. The setpoint value may in this case in particular be read from a characteristic diagram or ascertained mathematically.

The arrangement may be designed such that
the phase module branch contains surplus modules (what are known as redundant modules) that are intended to replace modules that have failed during operation of the multilevel power converter, and these surplus modules are also (always) operational during operation of the multilevel power converter. The average voltage of the energy stores of the modules of the phase module branch thereby drops.

The arrangement may also be designed such that
the maximum value former ascertains a common maximum value of the degree of modulation during the preselected time interval for multiple (in particular all) phase module branches of the multilevel power converter, and
the regulation device regulates the common maximum value of the degree of modulation to a setpoint value for the common maximum value of the degree of modulation.

The common maximum value of the degree of modulation may in this case in particular be the highest maximum value of the degree of modulation of the respective phase module branches.

The arrangement may be designed such that
the setpoint value for the maximum value of the degree of modulation is less than 1 by a preselected safety margin. This safety margin makes it possible to control the modular multilevel power converter.

The arrangement may also be designed such that
the modules each have a first electronic switching element, a second electronic switching element and the energy store, wherein the first electronic switching element, the second electronic switching element and the energy store are arranged in a half-bridge circuit, or
the modules each have a first electronic switching element, a second electronic switching element, a third electronic switching element, a fourth electronic switching element and the energy store, wherein the first electronic switching element, the second electronic switching element, the third electronic switching element, the fourth electronic switching element and the energy store are arranged in a full-bridge circuit.

The described method and the described arrangement have advantages that are the same or of the same type.

The method and the arrangement relate to the regulation of modular multilevel power converters during operation thereof. They may be applied to modular multilevel power converters in a wide variety of topologies, for example for modular multilevel power converters in a 6-pulse connection or in a delta connection. The following description is given largely with reference to a phase module branch of a modular multilevel power converter. A (large) number of modules are connected in series in such a phase module branch. The modules may be of different structure, for example in the form of a half-bridge module or in the form of a full-bridge module. A phase module branch is also referred to as a converter module.

In the quasi-stationary state, a different characteristic of the voltage $U_{conv}(t)$ to be set by the phase module branch results for each operating point of the power converter. This is given by external variables of the power converter: currents, voltages, required (reactive) power, circuitry components (for example inductors and transformers) and/or the topology of the converter.

These variables give a phase module branch current characteristic $I_{conv}(t)$ (specific to each operating point) and the product $U_{conv}(t) \times I_{conv}(t)$ gives the power characteristic or energy conversion of the phase module branch. Together with the dimensioning of the phase module branch (number of modules, capacitor size of the modules, operating voltage of the modules), this gives the characteristic of the voltage able to be set by the phase module branch. This is the voltage that the phase module branch could set in an instant if all of the modules were to be switched on simultaneously—that is to say the sum of all module voltages, $\Sigma U_{SM}(t)$ below. A basic requirement for the operation, regulation and dimensioning of the phase module branch in all modular multilevel power converters is: The sum voltage $\Sigma U_{SM}(t)$ of all available modules must at all times be at least as great as the voltage $U_{conv}(t)$ that the phase module branch is intended to set. The requirement means that it is not possible to output a larger voltage than is stored in the energy stores of the modules.

$$\Sigma U_{SM}(t) \geq U_{conv}(t) \tag{1}$$

If relationship (1) is not satisfied, the modular multilevel power converter may get out of control: It is not able to set the voltage needed to control the external variables (current, voltage, power, reactive power). The consequences range from not meeting specifications (for example fault ride through, voltage quality/THD, guaranteed operating points, etc.) up to fuse trips due to high currents. This may result in considerable problems.

If the variable degree of modulation a(t) is considered as the quotient of the set voltage to settable voltage, it follows for this degree of modulation that $$a(t) = \frac{U_{conv}(t)}{\sum U_{SM}(t)} \leq 1$$

The degree of modulation is often also referred to as "inner degree of modulation" or "inner modulation index".

The degree of modulation a(t) is generally a temporal characteristic that has a maximum once per grid period T. It is sufficient to apply the condition only to this peak value of the degree of modulation—it is then likewise satisfied at all other times.

$$a_{max} = \max_{0..T}\left(\frac{U_{conv}(t)}{\sum U_{SM}(t)}\right) \leq 1$$

The indication 0..T underneath the operator "max" means: maximum value over the time 0 to T, that is to say maximum value over a period duration.

Depending on the accuracy requirement and other boundary conditions (identical modules, sufficiently accurate voltage balancing within the phase module branch achieved by appropriately controlling/regulating the individual modules within the phase module branch), the degree of modulation may be described as the ratio of the number $N_{on}$ of switched-on modules to the total number $N_{available}$ of modules:

$$a(t) = \frac{N_{on}(t)}{N_{available}} \leq 1$$

The power converters therefore have to be dimensioned (number of installed modules per branch, module capacity, module voltage) such that, at the operating point with the highest requirements in terms of the ratio of set voltage to settable voltage, the degree of modulation remains <1. Advantageously, the safety margin to be complied with for regulation, dynamic range etc. is still taken into consideration in this case. For example, a<85% . . . a<90% are common for relatively small drive power converters. Large-scale power converters for HVDC transmissions, in which losses are of great economic significance, and which have very high series connection numbers N of modules, may also be designed for relatively high degrees of modulation.

As described at the outset, it is known, as part of energy regulation for the operation of the power converter or the phase module branches thereof, to implement a regulator that keeps the average value a) of the sum voltage $\Sigma U_{SM}(t)$ or alternatively b) of the individual module voltages $U_{SM}(t)$ constant over all operating points. The voltage average value may thus be illustrated in the form of a temporally averaged energy $$W_{conv} = \underset{0..T}{\text{mean}}\left(\frac{C_{SM}}{2}\sum U_{SM}^2(t)\right)$$

stored in the phase module branch. $C_{SM}$ is in this case the capacity of the energy store of a module. In this sense, reference is therefore also made to the power converter (module) energy, and to the energy regulation of the phase module branch or the energy regulation of the power converter. For the abovementioned variant b) (regulator that keeps the average value of the individual module voltages $U_{SM}(T)$ constant over all operating points), the following applies for the module energy:

$$W_{module} = \underset{0..T}{\text{mean}}\left(\frac{C_{SM}}{2}U_{SM}^2(t)\right).$$

This achieves module energy regulation.

The corresponding regulators compare the temporally averaged energies or voltages present in the modules or in the phase module branch with the (in particular fixed) setpoint value and set this, depending on the topology, by connecting in internal and/or external currents in the power converter.

Abovementioned relationship (1) is thus always satisfied during operation. The power converter is kept in stable operation. The power converter may set the external variables as required.

For a large number of operating points, the ratios in the quotient $$a(t) = \frac{U_{conv}(t)}{\sum U_{SM}(t)}$$

are however considerably simpler than at the worst-case operating point from which the energy setpoint value is determined. Specifically at partial-load and low-load operating points, the energy conversion is low, and is therefore only impacted by a slight ripple. The amplitude of the set voltage $U_{conv}(t)$ may also turn out to be smaller than at the worst-case operating point, or the temporal characteristic of both variables may coincide in a favorable manner. As a result, an unnecessarily large amount of energy is stored in the phase module branches at these operating points (that is to say at almost all operating points) of the power converter. The power converter may set an unnecessarily large amount of voltage, and the average voltage of the modules is excessively high.

Such (energy) regulation has disadvantages:

Unnecessarily high power converter losses are generated, since the switching losses of the semiconductors are scaled roughly linearly with the module voltage.

The components of the modules are loaded unnecessarily with voltage, which has a negative impact on their service life.

An unnecessarily large number of modules are in the freewheeling state on average over time, in which state they do not set any voltage (the degree of modulation is low). The electronic switching elements in the module that carry current in this state are thereby loaded to a greater extent. Exactly these electronic switching elements are however already those that are loaded to the greatest extent in most modular multilevel power converter topologies (in particular in the 6-pulse bridge circuit with half-bridge modules), and are usually the limiting factor with regard to the maximum power converter current. The admissible power converter current is thereby disadvantageously limited in such known regulation.

In contrast to the known energy regulation, the object mentioned at the outset is achieved in that no energy or voltage, but rather the maximum value of the degree of modulation (peak degree of modulation) is regulated, in particular within a period of the AC voltage grid (and in particular in the quasi-stationary state), to a fixed setpoint value or one predefined in an operating point-specific manner (for example from a characteristic diagram).

For this purpose, the peak degree of modulation for each phase module branch may be ascertained for example in accordance with the relationships $$a_{max} = \underset{0..T}{\max}\left(\frac{U_{conv}(t)}{\sum U_{SM}(t)}\right)$$

or $$a_{max} = \underset{0..T}{\max}\frac{N_{on}(t)}{N_{available}}.$$

In particular the variables $U_{conv}(t)$, $\Sigma U_{SM}(t)$ and $N_{on}(t)$. Navailable are often already known and/or are easy to ascertain in existing regulation operations.

Uconv(t) is the voltage to be set by the phase module branch (converter module) or the voltage set by the phase module branch. It is able to be measured and/or calculated based on the operating point of the power converter and its circuitry.

$\Sigma U_{SM}(t)$ is the sum of the module voltages in the phase module branch. It is able to be measured. It may be expedient here to consider only the voltages of fault-free modules that follow the regulation without any problems.

$N_{on}$ is the number of voltage-setting modules in the phase module branch (that is to say the number of switched-on modules), and may be determined in particular from the power converter module control operation.

$N_{available}$ is the number of modules of the phase module branch. In this case too, it may be expedient to consider only fault-free modules that follow the regulation without any problems.

The maximum value may be formed by various signal processing elements. A digital/algorithmic implementation of a maximum value former is advantageous, for example.

A regulator connected downstream of the maximum value former compares the ascertained maximum value of the degree of modulation with a setpoint value and sets the maximum value, for example by connecting in internal and/or external currents in the power converter.

In this case, the following applies analogously:

If the maximum value of the degree of modulation of the phase module branch is greater than the desired setpoint value, then the energy content of the phase module branch or of the modules is increased.

If the maximum value of the degree of modulation of the phase module branch is less than the setpoint value, then the energy content of the phase module branch or of the submodules is reduced.

The behavior of the regulator may be configured differently for both directions. For example, a high sensitivity/gain may be favorable in the event of an excessively high degree of modulation, while the sensitivity/gain is set to be low in the event of a low degree of modulation. This thus achieves a situation whereby the power converter, in the event of an excessively low energy/settable voltage—that is to say at a short distance from loss of control—is able to be brought quickly and safely out of this risky state. In the event of excessively high energy, that is to say a situation that is non-critical with regard to stability but non-optimal with regard to losses, there is a slow approach to the optimum with regard to losses. The possibility of maximum value detection as shown in connection with FIG. 6 already contains these properties.

The regulation designed in this way lowers the phase module branch energy adaptively with respect to the operating point to the extent that exactly the setpoint value of the maximum value of the degree of modulation is always reached in quasi-stationary operation. This then always gives in particular at least the corresponding safety margin with respect to loss of control, but the module voltages are not higher than needed for this. In comparison with regulation to an energy setpoint value (energy regulation), the phase module branch energy is lowered automatically at operating points at which it is excessively high.

The regulation may thus be implemented such that the regulation device changes the energy setpoint value for an energy regulator in order to regulate the maximum value of the degree of modulation. The regulation device for regulating the maximum value of the degree of modulation is then made superordinate to the energy controller.

However, it is also possible to do away with the energy regulator, that is to say to use energy regulator-free regulation. The power converter may then be controlled or regulated by regulating the voltage ratios or the switching state ratios of the modules. This then does away with the complex calculation of the power converter energy or the phase module branch energy, which would have to be done for example with difficulty by squaring the individual voltages of the modules and then summing them.

The maximum value of the degree of modulation may be regulated separately for each phase module branch. Any redundant modules of the phase module branches that are present may then in particular also be used to reduce the module voltages.

The regulation of the maximum value of the degree of modulation may however also be applied as a simplification to the entire power converter. Only the highest maximum value of the degree of modulation $a_{max}(t)$ of all phase module branches that are present is then used, and all phase module branches (converter modules) are regulated to the same setpoint value. If possibly different numbers of redundant modules are present in the individual phase module branches, then not all of these may potentially be used for voltage reduction purposes. The automatic operating point-specific/operating point-adaptive lowering of the voltage of the modules is however still achieved.

The invention is explained in more detail below with reference to exemplary embodiments. The same reference signs in this case refer to identical or functionally identical elements.

DETAILED DESCRIPTION OF THE INVENTION

Figure 1:
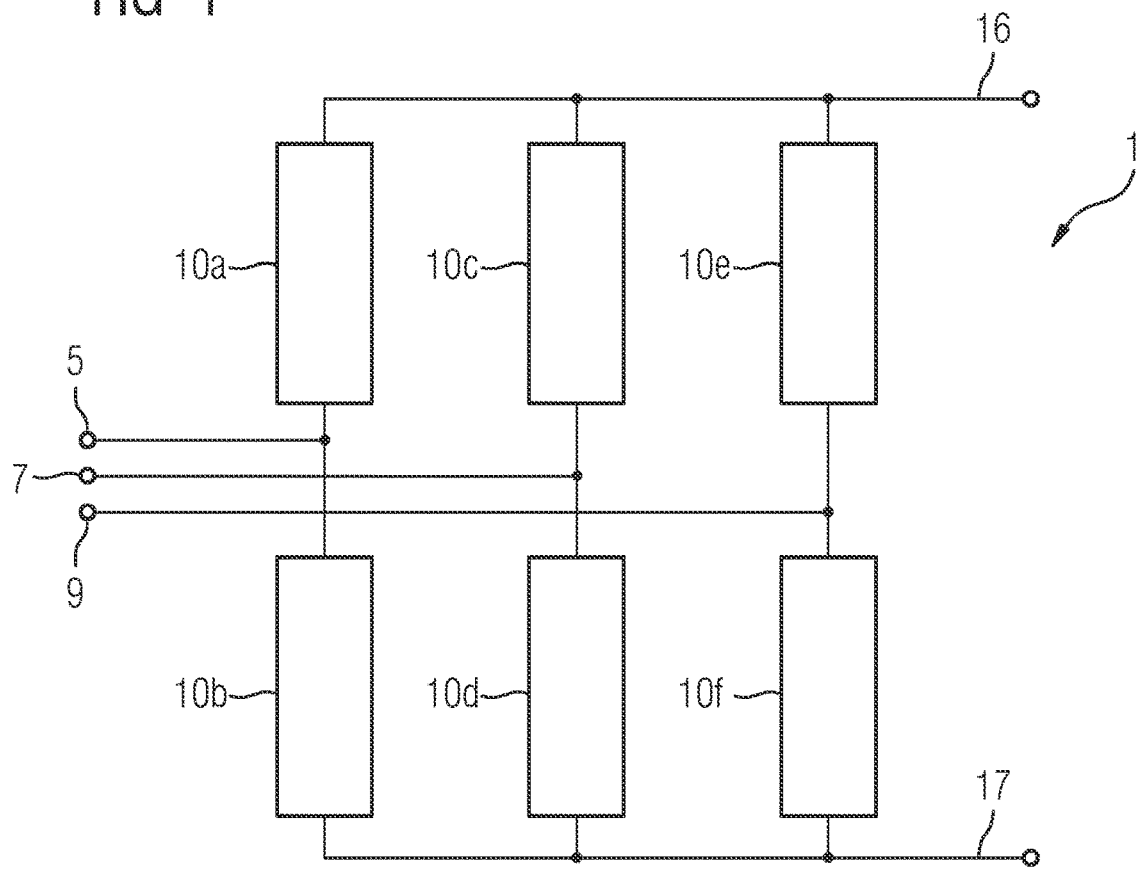
FIG. 1 illustrates an exemplary embodiment of a modular multilevel power converter in a bridge circuit.

FIG. 1 illustrates an exemplary embodiment of a modular multilevel power converter 1. This multilevel power converter has a first AC voltage terminal 5, a second AC voltage terminal 7 and a third AC voltage terminal 9. The first AC voltage terminal 5 is electrically connected to a first phase module branch 10a and a second phase module branch 10b. The first phase module branch 10a and the second phase module branch 10b form a first phase module of the modular multilevel power converter 1. The end of the first phase module branch 10a remote from the first AC voltage terminal 5 is electrically connected to a first DC voltage terminal 16; the end of the second phase module branch 10b remote from the first AC voltage terminal is electrically connected to a second DC voltage terminal 17. The first DC voltage terminal 16 is a positive DC voltage terminal, and the second DC voltage terminal 17 is a negative DC voltage terminal.

The second AC voltage terminal 7 is electrically connected to an end of a third phase module branch 10c and to an end of a fourth phase module branch 10d. The third phase module branch 10c and the fourth phase module branch 10d form a second phase module. The third AC voltage terminal 9 is electrically connected to an end of a fifth phase module branch 10e and to an end of a sixth phase module branch 10f. The fifth phase module branch 10e and the sixth phase module branch 10f form a third phase module. Each phase module branch has a plurality of modules that are electrically connected in series (by way of their module terminals). This is explained below in connection with FIG. 3. The individual modules of the phase module branches are driven by a driver (cf. FIGS. 8 and 9). This driver may, where necessary, drive the individual modules such that each of the modules provides a voltage with a polarity, a voltage of the value zero (what is known as a zero voltage) or possibly even a voltage of the opposing polarity. The phase module branch voltage $U_{conv}$ is thereby generated.

The modular multilevel power converter 1 in the exemplary embodiment of FIG. 1 is a modular multilevel power converter in a bridge circuit, more precisely in a 6-pulse bridge circuit.

Figure 2:
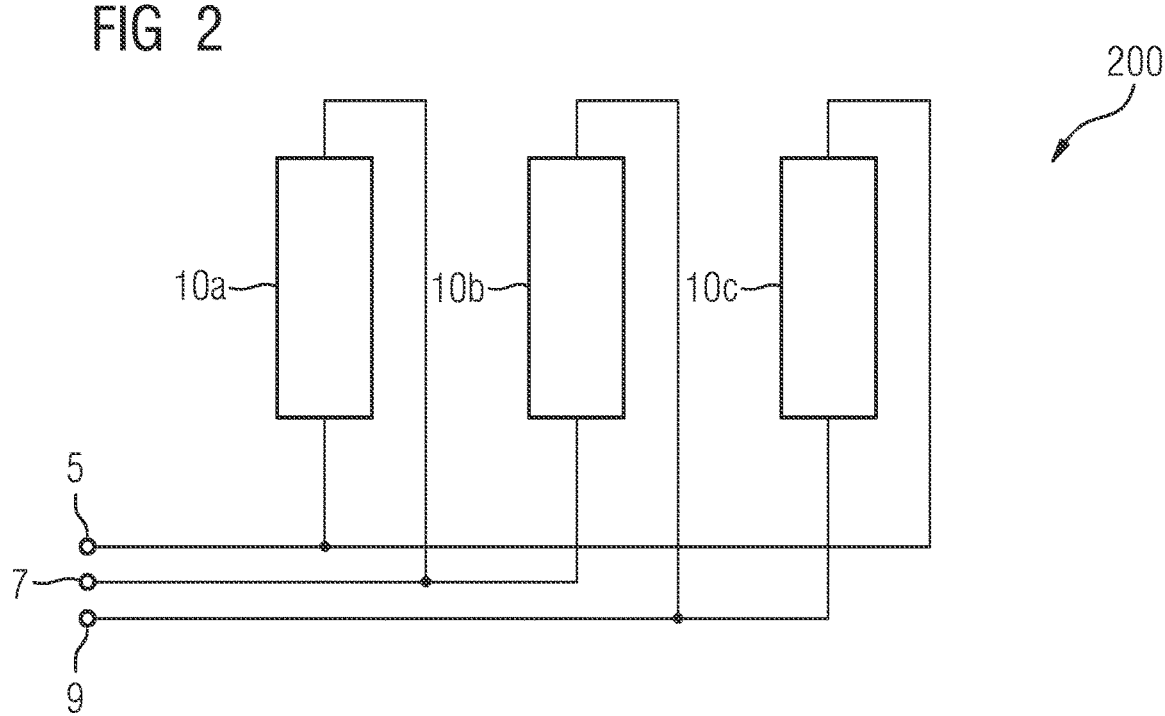
FIG. 2 illustrates a further exemplary embodiment of a modular multilevel power converter in a delta connection.

FIG. 2 illustrates a further modular multilevel power converter 200 that has a delta connection. This multilevel power converter 200 has only the first phase module branch 10a, the second phase module branch 10b and the third phase module branch 10c. These three phase module branches 10a, 10b and 10c are connected in a delta connection, with the apexes of the delta each being guided out as the AC voltage terminal 5, 7 and 9, respectively.

Figure 3:
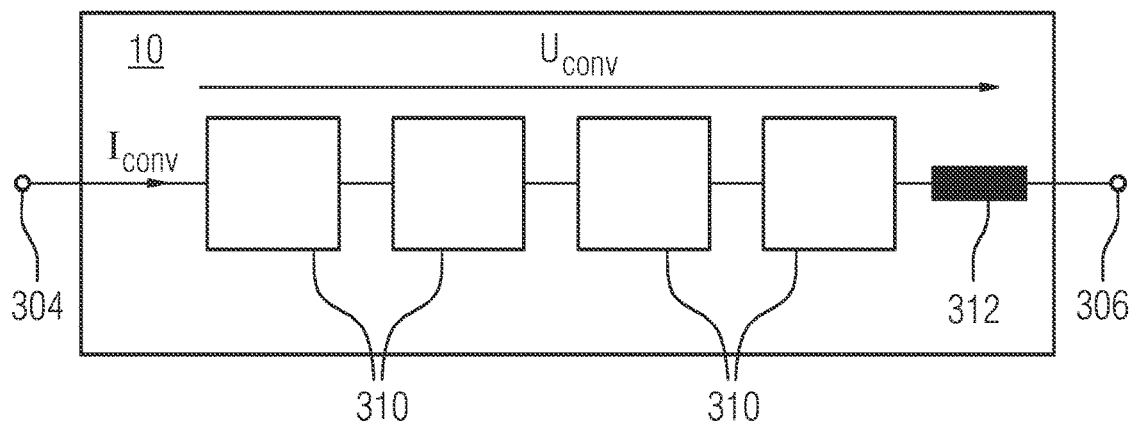
FIG. 3 illustrates an exemplary embodiment of a phase module branch.

FIG. 3 illustrates an exemplary embodiment of a phase module branch 10. The phase module branches illustrated in FIGS. 1 and 2 may in particular be designed in the same way as the phase module branch 10.

The phase module branch 10 has a first branch terminal 304 and a second branch terminal 306. The first branch terminal 304 is electrically connected to an end of a series circuit of a plurality of modules 310. The other end of the series circuit of the modules 310 is electrically connected to the second branch terminal 306 via an inductor 312. The phase module branch voltage $U_{conv}$ occurs at the phase module branch 10. The phase module branch current $I_{conv}$ flows through the phase module branch 10. The phase module branch voltage $U_{conv}$ is the voltage that is output between the two branch terminals 304 and 306, as symbolized by an arrow in FIG. 3.

The number of modules in the phase module branch 10 may be very different. At least two modules 310 must be connected in series, but a considerably larger number of modules may also be connected in series. By way of example, several tens or even several hundreds of modules may thus be connected in series, thereby making it possible to achieve correspondingly high phase module branch voltages $U_{conv}$.

The phase module branch 10 may also have surplus modules. These are modules that are intended to replace modules that have failed during operation of the multilevel power converter and that would not actually be necessary if ideally no modules of the multilevel power converter were to fail. Such modules are also referred to as redundant modules. Advantageously, these surplus modules are always also put into operation during operation of the multilevel power converter, that is to say the energy stores of these modules are likewise charged and, when necessary, the voltages of the energy stores of these modules also contribute to the phase module branch voltage $U_{conv}$. As a result, in particular more modules are available in the series circuit of the phase module branch, meaning that the voltage is able to be distributed among more modules and the individual modules are thereby loaded only with a lower average voltage. The service life of the modules is thereby increased.

The modules 310 of the phase module branches may have different configurations. The modules have in particular two module terminals; they are thus in particular two-pole modules. Two variants of such modules are described by way of example below.

Figure 4:
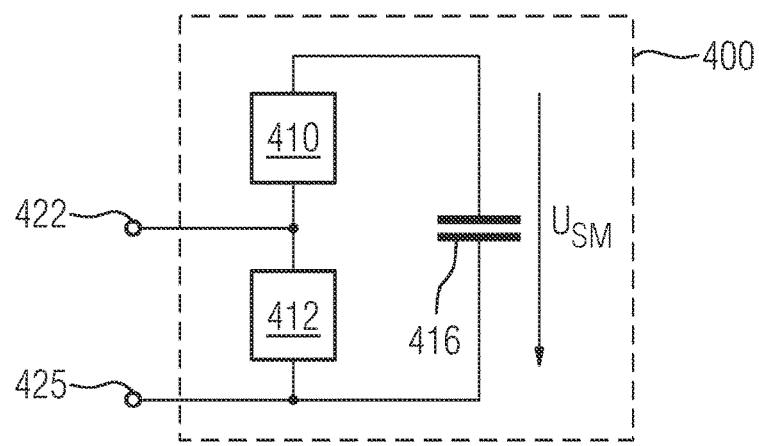
FIG. 4 illustrates an exemplary embodiment of a module using half-bridge technology.

FIG. 4 illustrates an exemplary embodiment of a module 400 of the phase module branch 100, wherein the module 400 is designed as a half-bridge module 400. The module 400 has a first electronic switching element 410 (that is able to be switched off), a second electronic switching element 412 (that is able to be switched off) and an energy store 416. The electrical energy store 416 is a capacitor 416. The energy store voltage $US_M$ is present across the capacitor 416 and, in the exemplary embodiment (when the first electronic switching element 410 and the second electronic switching element 412 are switched appropriately), is the module voltage of the module 400 that is able to be provided.

The first electronic switching element 410 and the second electronic switching element 412 may each be designed for example as an IGBT (insulated-gate bipolar transistor) with a diode connected in antiparallel. The first switching element 410 is electrically connected in series with the second switching element 412. A first (galvanic) module terminal 422 is arranged at the connection point between the two electronic switching elements 410 and 412. A second (galvanic) module terminal 425 is arranged at the terminal of the second electronic switching element 412, which is opposite the connection point. The second module terminal 425 is also electrically connected to a first terminal of the energy store 416; a second terminal of the energy store 416 is electrically connected to the terminal of the first electronic switching element 410, which is opposite the connection point.

The energy store 416 is thus electrically connected in parallel with the series circuit of the first electronic switching element 410 and the second electronic switching element 412. Driving the first electronic switching element 410 and the second electronic switching element 412 appropriately makes it possible to achieve a situation whereby either the voltage of the energy store 416 is output between the first module terminal 422 and the second module terminal 425 or no voltage is output (that is to say a zero voltage is output). The respectively desired phase module branch voltage may thus be generated through the interaction of the modules of the phase module branch.

Figure 5:
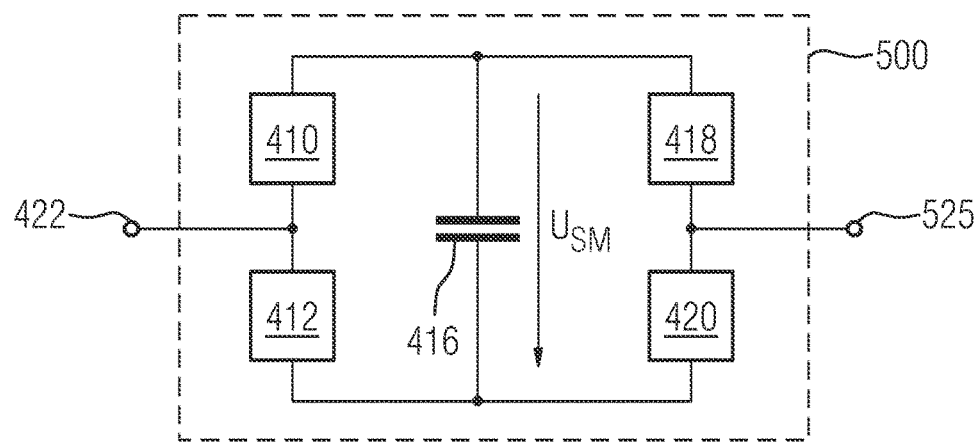
FIG. 5 illustrates an exemplary embodiment of a module using full-bridge technology.

FIG. 5 illustrates a further exemplary embodiment of a module 500 of the phase module branch. This module 500 is a full-bridge module.

In addition to the first electronic switching element 410, second electronic switching element 412 and energy store 416 already known from FIG. 4, the module 500 illustrated in FIG. 5 additionally has a third electronic switching element 418 and a fourth electronic switching element 420. The third electronic switching element 418 and the fourth electronic switching element 420 may likewise be designed as an IGBT with a freewheeling diode connected in antiparallel. Unlike the circuit of FIG. 4, the second module terminal 525 is not electrically connected to the second electronic switching element 412, but rather to a center tap (connection point) of an electrical series circuit of the third electronic switching element 418 and the fourth electronic switching element 420.

The full-bridge module 500 is distinguished in that, when the four electronic switching elements between the first module terminal 422 and the second module terminal 525 are driven appropriately, either the positive voltage of the energy store 416, the negative voltage of the energy store 416 or a voltage with the value zero (zero voltage) is able to be selectively output. The polarity of the output voltage is thus able to be reversed by way of the module 500. A phase module branch of the multilevel power converter may for example contain either only half-bridge modules, only full-bridge modules or both half-bridge modules and full-bridge modules.

Figure 6:
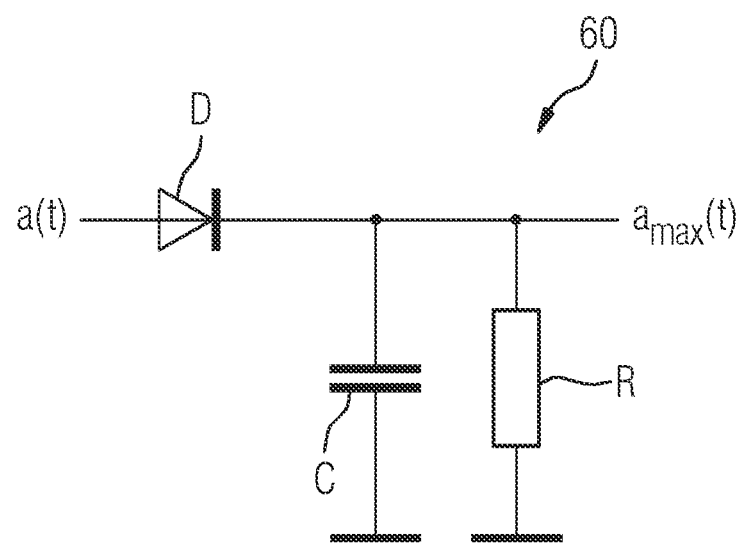
FIG. 6 illustrates an exemplary embodiment of a maximum value former.

FIG. 6 illustrates an exemplary embodiment of a maximum value former 60 (peak detector 60). A signal with the temporal characteristic of the degree of modulation a(t) is fed in at an input of the maximum value former 60. The signal for the degree of modulation a(t) charges a capacitor C via a diode D. In this case, the capacitor C charges to the maximum value of the signal for the degree of modulation a(t), such that a signal with the temporal characteristic of the maximum value of the degree of modulation $a_{max}(t)$ is output at an output of the maximum value former 60. The capacitor C discharges (relatively slowly) with a predefined time constant across a resistor R. This ensures that the capacitor C does not remain charged permanently to a voltage maximum value that is reached once. The maximum value former 60 is thereby able to operate correctly, even in the event of temporal characteristics of the degree of modulation a(t) with maximum values that become increasingly small.

The mode of operation of this maximum value former 60 may also be emulated in a time-discrete digital manner, for example by the following program code.

```
if a(k)>amax(k-1)
   amax(k)=a(k)
else
   amax(k)=amax(k-1)-falloff
end
```

In this case, a(k) is a time-discrete sequence of the degree of modulation and amax(k) is a time-discrete sequence of the maximum value of the degree of modulation. The value falloff simulates the discharging of the capacitor C across the resistor R. k is the index of the time-discrete values.

Figure 7:
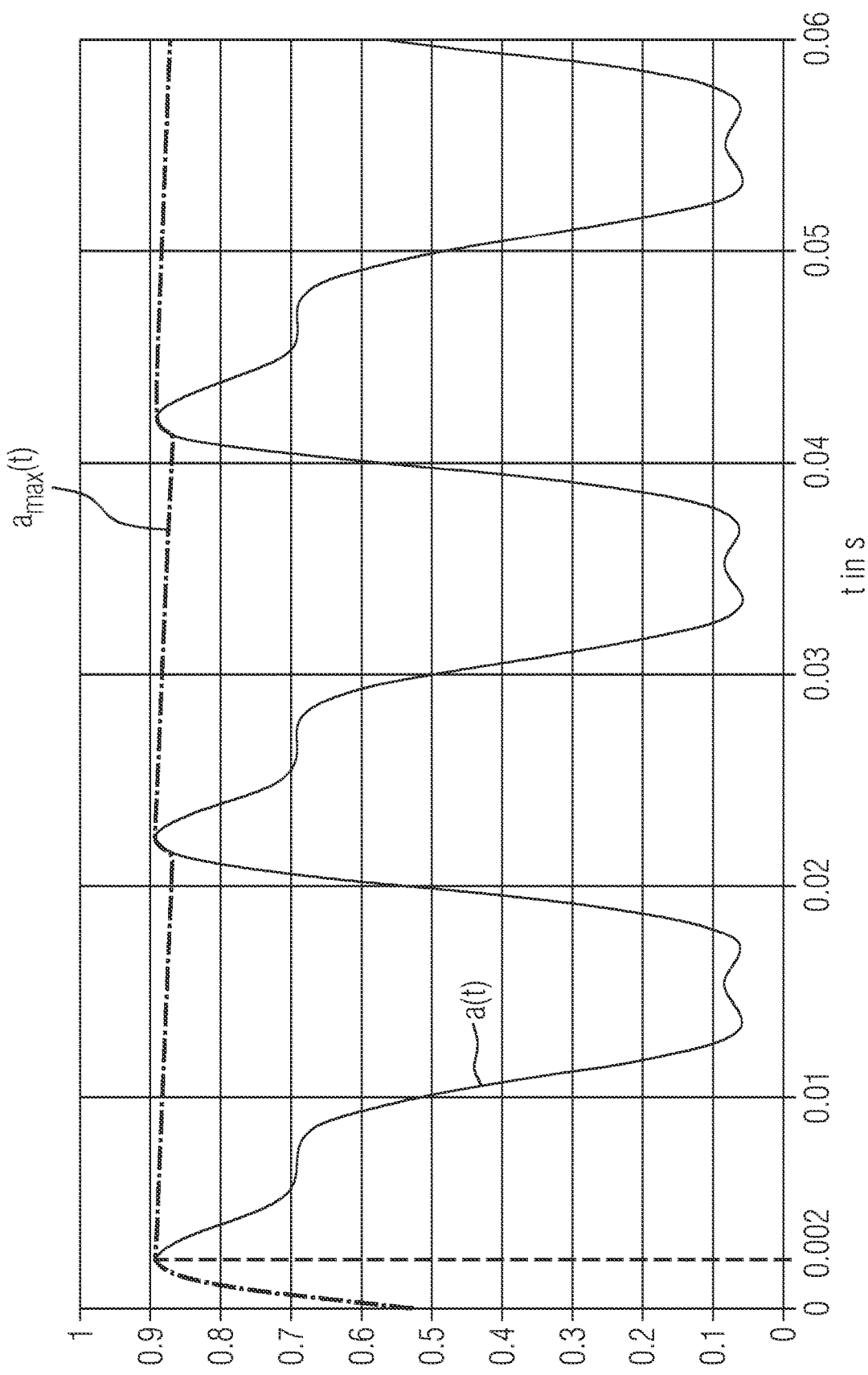
FIG. 7 illustrates an exemplary characteristic of the degree of modulation of a phase module branch.

FIG. 7 illustrates a graph of an exemplary characteristic of the degree of modulation a(t) of the phase module branch 10 and of the maximum value $a_{max}(t)$ of the degree of modulation. In this case, the degree of modulation a(t) describes the ratio between the phase module branch voltage output by the phase module branch and the maximum phase module branch voltage able to be output. The maximum phase module branch voltage able to be output corresponds to the sum of the voltages of the energy stores of the modules of the phase module branch. The degree of modulation a(t) therefore describes the ratio between the phase module branch voltage output by the phase module branch and the sum of the voltages of the energy stores of the modules of the phase module branch.

In the graph, the time t is plotted in seconds on the X-axis and the degree of modulation a(t) and the maximum value $a_{max}(t)$ of the degree of modulation are plotted in the form of a scale from 0 to 1 (corresponds to 0% to 100%) on the Y-axis. The degree of modulation a(t) in the exemplary embodiment is a periodic function with the period duration T=0.02 s, which corresponds to a frequency of 50 Hz. It may be readily seen that the degree of modulation a(t), during each period T, has a maximum that lies at 0.9 (corresponds to 90%) in the exemplary embodiment. The upper part of the FIG. illustrates the characteristic of the maximum value of the degree of modulation $a_{max}(t)$ by way of a dot-and-dash line. In the region from 0 to around 0.002 seconds, the characteristic of the degree of modulation a(t) rises continuously; in this region, the characteristic of the maximum value amax(t) therefore corresponds to the characteristic of the degree of modulation a(t). After the time t=0.002 s, the characteristic of the degree of modulation drops, such that the maximum value of the degree of modulation does not follow the falling characteristic of the degree of modulation, but rather remains (almost) constant. However, the maximum value of the degree of modulation does not remain absolutely constant, since the maximum value former would otherwise not be capable of adapting to a maximum value of the degree of modulation that becomes smaller over time. For this reason, the maximum value former is designed such that the maximum value of the degree of modulation drops linearly with time. This corresponds to the value falloff explained above. Just before the time T+0.002 s, the current value of the degree of modulation becomes greater than the value (which has already fallen slightly up to now due to the value falloff) of the maximum value of the degree of modulation, such that the maximum value of the degree of modulation then follows the rising section of the degree of modulation again. The sequence then repeats itself periodically with the period duration T.

Figure 8:
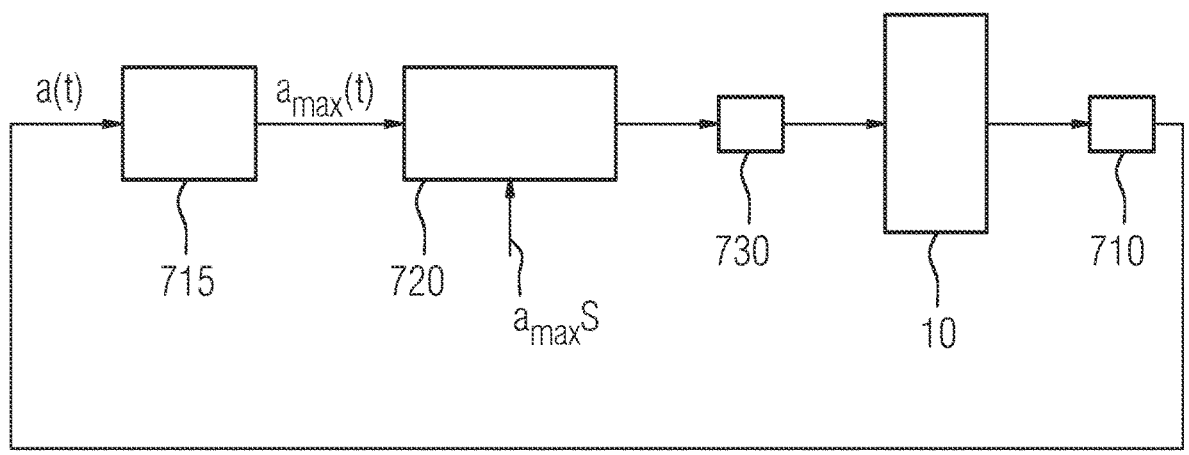
FIG. 8 illustrates an exemplary regulation loop for regulating the maximum value of the degree of modulation.

FIG. 8 illustrates an exemplary regulation circuit for regulating a modular multilevel power converter. Only one phase module branch 10 of the modular multilevel power converter is illustrated in the figure, and the regulation takes place in the same way for the other phase module branches. The degree of modulation a(t) of the phase module branch 10 is ascertained by way of an ascertainment device 710. This may—as explained in detail above—take place for example by evaluating the voltages of the modules of the phase module branch or by evaluating the number of switched-on modules of the phase module branch.

The degree of modulation a(t) is transmitted to a maximum value former 715. The maximum value former 715 ascertains the maximum value $a_{max}(t)$ of the degree of modulation a(t) from the degree of modulation a(t). This maximum value $a_{max}(t)$ of the degree of modulation forms an input variable for the regulation device 720. A setpoint value $a_{max}s(t)$ for the maximum value $a_{max}(t)$ of the degree of modulation forms a further input value for the regulation device 720. The regulation device 720 ascertains the voltages to be output by the modules 310 of the phase module branch 10 and transmits information about these voltages to be output to a driver 730. The driver 730 converts this information into drive signals for the individual electronic switching elements of the corresponding modules and transmits these drive signals to the individual modules 310 of the phase module branch 10. The individual modules 310 of the phase module branch 10 are then switched such that the desired voltages occur at the modules and thus also the desired setpoint value $a_{max}s(t)$ for the maximum value of the degree of modulation occurs. The ascertainment device 710 then ascertains the degree of modulation a(t) again and feeds it back to the maximum value former 715.

A constant setpoint value $a_{max}s$ or an operating point-dependent setpoint value $a_{max}s(t)$ may be used as setpoint value $a_{max}s$ (t) for the maximum value of the degree of modulation. Such a setpoint value dependent on the operating point of the phase module branch may in particular be read from a characteristic diagram or ascertained from the operating point voltage $U_{conv}$ and the operating point current $I_{conv}$ mathematically.

A setpoint value $a_{max}s$ for the maximum value $a_{max}(t)$ of the degree of modulation that is less than 1 (that is to say less than 100%) by a preselected safety margin is preferably predefined. This ensures that the modular multilevel power converter remains controllable or regulatable, that is to say that the voltage generated by the modular multilevel power converter is able to be varied in both directions when needed, that is to say is able to be increased or reduced. The safety margin may for example be 15%, such that the setpoint value $a_{max}s$ in the example is 0.85.

Optionally, a common setpoint value $a_{max}s(t)$ may be used for the maximum value of the degree of modulation a(t) for all phase module branches of the multilevel power converter (that is to say for example for the six phase module branches 10a to 10f in the multilevel power converter of FIG. 1). The maximum value former 715 then ascertains the greatest of the six maximum values of the individual phase module branches and forwards this to the regulation device 720 as the maximum value $a_{max}(t)$.

Figure 9:
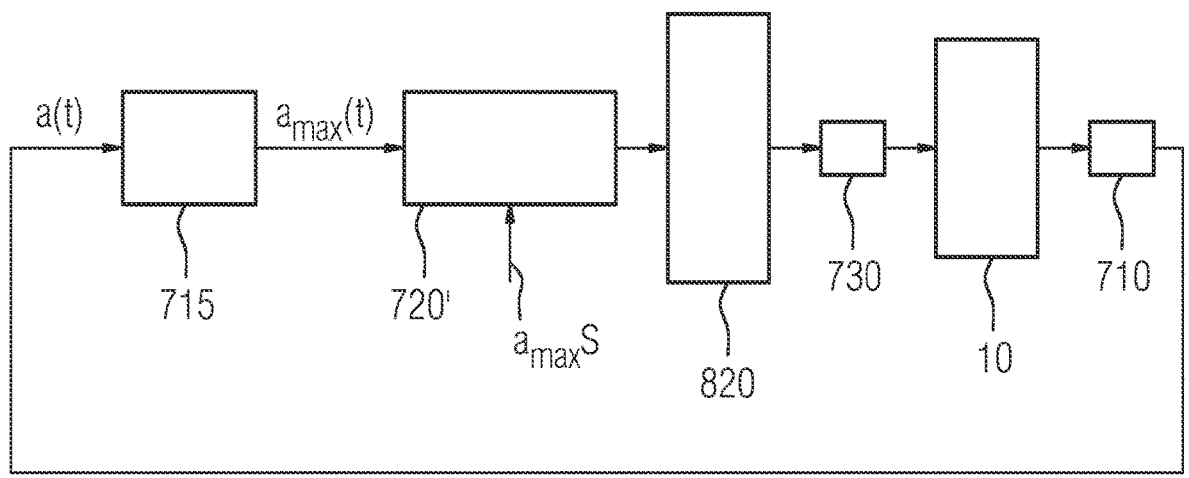
FIG. 9 illustrates a further regulation loop for regulating the maximum value of the degree of modulation.

FIG. 9 illustrates a further exemplary embodiment of a regulation loop for regulating the maximum value of the degree of modulation. This regulation loop differs from the regulation loop of FIG. 8 essentially in that a further regulation device 820 is connected between the regulation device 720' and the driver 730. The further regulation device 820 may for example be a regulation device for the energy of the phase module branch 10 (that is to say for the total energy stored in the phase module branch 10) or a regulation device for the current $I_{conv}$ flowing through the phase module branch 10 or a regulation device for the phase module branch voltage $U_{conv}$. The regulation device 720' (which regulates the maximum value $a_{max}(t)$ of the degree of modulation $a(t)$) forms a superordinate regulation device with respect to the further regulation device 820. The regulation device 720' outputs a setpoint value associated with the corresponding setpoint value $a_{max}s$ for the phase module branch energy or for the phase module branch voltage to the further regulation device 820. The further regulation device 820 then regulates the phase module branch energy or the phase module branch voltage and outputs the corresponding module voltages to the driver 730. This variant of the regulation circuit is particularly advantageous when a multilevel power converter with a further regulation device 820' is already present and is intended to be upgraded for the purpose of regulating the maximum value $a_{max}(t)$ of the degree of modulation $a(t)$ by having the superordinate regulation device 720' added thereto.

Figure 10:
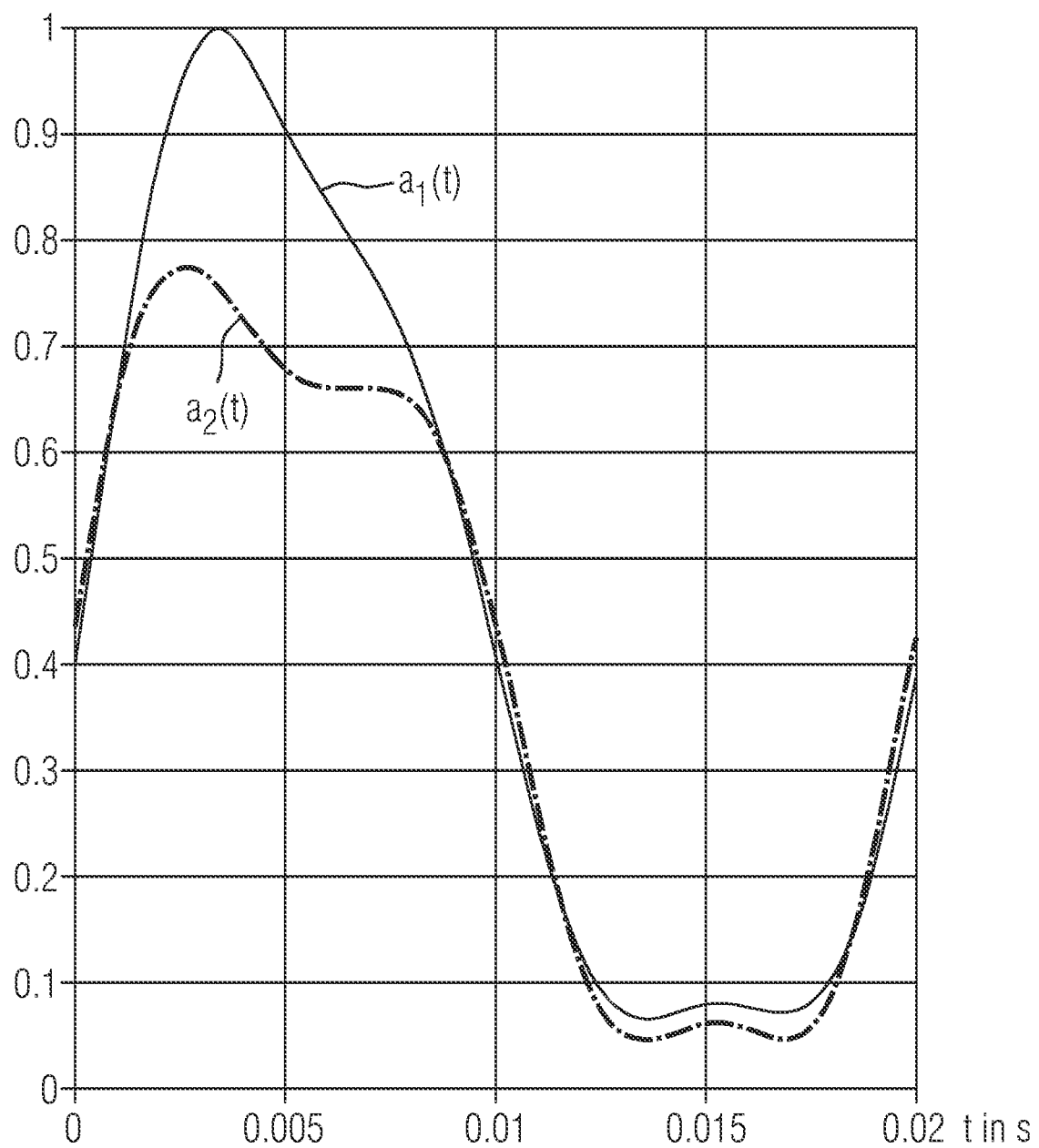
FIG. 10 illustrates exemplary temporal characteristics of degrees of modulation in the known energy regulation.

FIG. 10 illustrates an exemplary temporal characteristic of degrees of modulation during the above-described energy regulation to constant energy according to the prior art. In this case, for two different operating points 1 and 2, respectively the temporal characteristic of the first degree of modulation $a1(t)$ associated with the first operating point and the temporal characteristic of the second degree of modulation $a2(t)$ associated with the second operating point are illustrated. The time is plotted in s for a period (0.02 s) of the grid frequency on the X-axis, and the degrees of modulation $a1(t)$ and $a2(t)$ are plotted on the Y-axis. In this case, the first degree of modulation $a1(t)$ associated with the first operating point is illustrated as a continuous line and the second degree of modulation $a2(t)$ associated with the second operating point is illustrated as a dot-and-dash line. The first operating point 1 and the second operating point 2 are coupled to one another such that the average energy stored in the phase module branch is identical at both operating points.

The first operating point 1 is the worst-case operating point, that is to say the operating point with the least favorable conditions for the power converter. The energy regulation is set such that the power converter still works even at this worst-case operating point 1. This may be seen in that the first degree of modulation $a1(t)$ reaches the value 1, but does not exceed it. No safety margin with respect to the value 1 is illustrated here, because only the principle is intended to be explained. In practice, the regulation would be set so as to comply with a safety margin with respect to the value 1—the maximum value of the degree of modulation would then be a value less than 1, for example 0.9.

The second degree of modulation $a2(t)$ associated with the second operating point has a considerably smaller maximum, which lies at around 0.77. This means that more energy is stored in the phase module branch than is required for the second operating point. The degree of modulation $a2(t)$ is thus comparatively small at the second operating point. This leads to the disadvantages that are indicated above in connection with the energy regulation.

Figure 11:
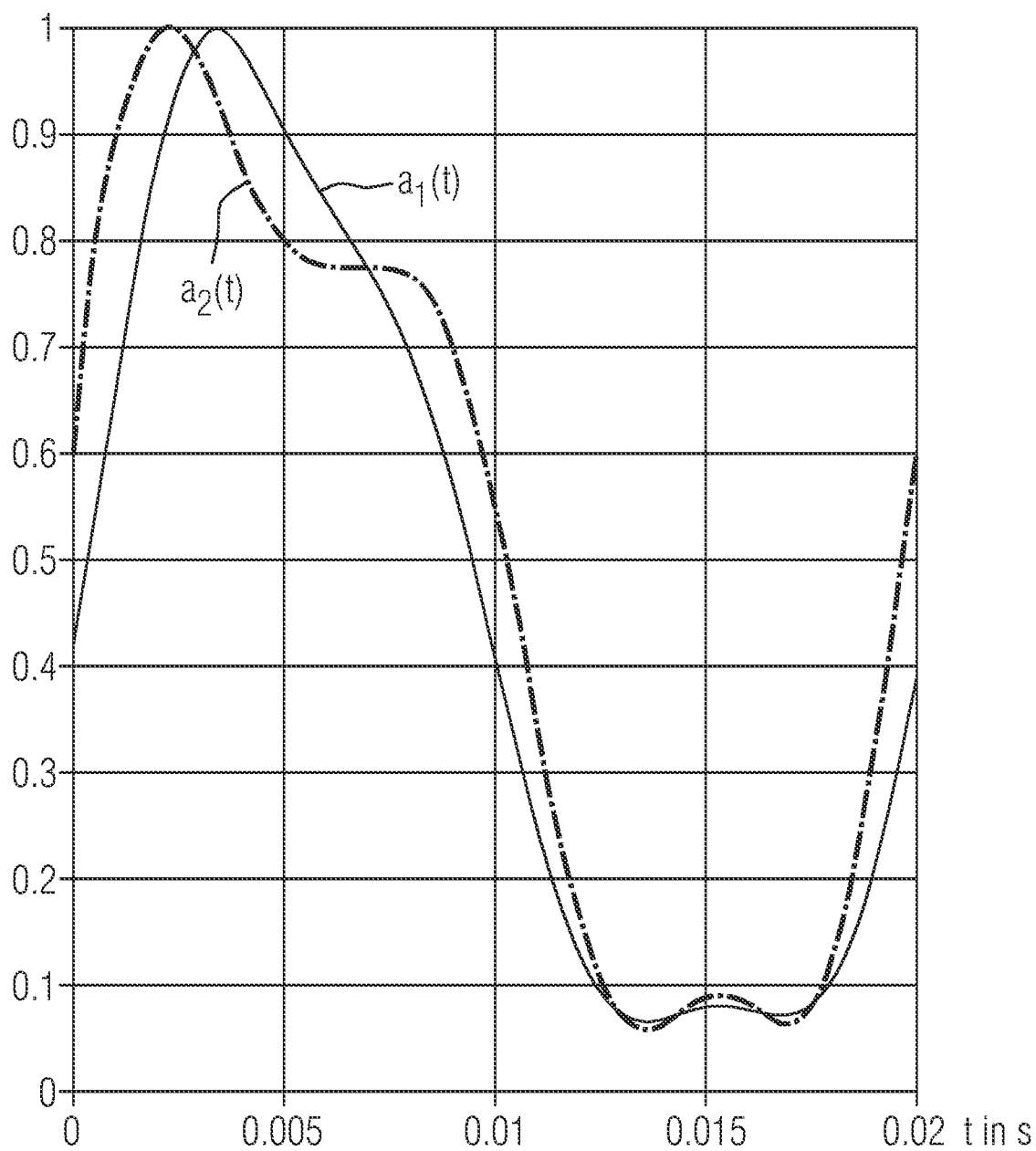
FIG. 11 illustrates exemplary temporal characteristics of degrees of modulation when regulating the maximum value of the degree of modulation.

FIG. 11 illustrates an exemplary temporal characteristic of degrees of modulation for the described method and the described arrangement with regulation of the maximum value of the degree of modulation. The two operating points 1 and 2 of the power converter are identical to the operating points from the previous figure. The first degree of modulation $a1(t)$ associated with the first operating point and the second degree of modulation $a2(t)$ associated with the second operating point both have the value 1 as maximum value. The operating point 2 is thus also fully modulated. The energy stored in the phase module branch is reduced for this second operating point 2 in comparison with the energy regulation illustrated above. The average voltage of the energy stores of the modules of the phase module branch is thus also reduced at the second operating point 2. The maximum value of the degree of modulation therefore also reaches its setpoint value at the operating point 2 (here 1, corresponds to 100%). Furthermore—considered on average over all operating points of the power converter—the maximum voltage occurring in the phase module branch is lower than in the case of the energy regulation to constant energy. The modular multilevel power converter may therefore be implemented with the described regulation arrangement and described regulation method with fewer modules than in the case of energy regulation.

A description has been given of a method for regulating a modular multilevel power converter and an arrangement for regulating a modular multilevel power converter, by way of both of which it is possible to regulate a modular multilevel power converter such that only comparatively low losses occur in the modules of this power converter, and the modules have a comparatively long service life. This is achieved by virtue of the maximum value of the degree of modulation of at least one phase module branch of the power converter being regulated to a setpoint value for this maximum value of the degree of modulation. This avoids unnecessarily high energy content of the modules and therefore also unnecessarily high voltages of the energy stores of the modules. This leads to significantly reduced power losses and, due to a lower voltage stress on the components, to a longer service life of the modules.

The described method for regulating the maximum value of the degree of modulation and the described arrangement may have individual ones, several or all of the following features or advantages. The following advantages are mentioned:

- Automatic lowering of the voltage of the energy stores takes place at operating points at which no high power converter energy (and thus no high voltages at the energy stores of the modules of the power converter) is required.
- The components of the modules are preserved as a result, and the modules end up having a longer service life.
- Power converter losses are able to be reduced. At full load of the power converter, the reduction in the losses will be relatively low, but at low load, that is to say at a lower degree of utilization of the power converter, larger reductions in losses are able to be achieved.
- The maximum value of the degree of modulation remains substantially constant independently of the operating point and does not drop in particular in the event of an undervoltage or during partial load operation. The electronic switching elements of the modules are thereby unburdened in the freewheeling state. The freewheeling state is present when a module does not make available a voltage other than zero at its module terminals, that is to say when the module does not actively contribute to the phase module branch voltage. By way of example, in the half-bridge module, the second electronic switching element 412 is switched on in the freewheeling state. This second electronic switching element 412 is loaded to the greatest extent in the half-bridge module, as a result of which the maximum permissible current is limited. In the half-bridge module, this second electronic switching element is in particular unburdened, and, in the full-bridge module, all four electronic switching elements are able to be unburdened. This results in a saving on components and a further power loss reduction for both modules. Higher currents may optionally be achieved.

The maximum value of the degree of modulation remains constant even when using redundant modules or in the event of failure of redundant modules. The temporal characteristic of the degree of modulation also remains almost unchanged. No additional loading of the electronic switching elements of the modules therefore occurs, even when using redundant modules.

Coupling of the individual operating points of the power converter via the same power converter energy is dispensed with (such coupling would occur if the energy in the phase module branches were to be regulated to the same value for all operating points). This makes it possible—in particular under challenging conditions, such as for example modules with small energy stores and a low maximum operating voltage but a high operating current—to design the multilevel power converter with fewer modules than previously. It is therefore possible to implement power converters with constant power data, but with fewer modules.

A simplified ability to design multilevel power converters in relation to redundant modules and current-carrying capacity is possible.

The described regulation of the maximum value of the degree of modulation may be applied as an optimization/upgrade to pre-existing multilevel power converters, in particular including to existing systems.

The average reduction in the voltage of the energy store of the modules results in smaller voltage increments in the voltage generated by the multilevel power converter. This makes it possible to achieve improved electromagnetic compatibility and a smaller deviation of the generated voltage from the pure sinusoidal voltage (less harmonic distortion).

The following features of the method and of the arrangement are cited:

Ascertaining the maximum value of the degree of modulation of the phase module branch by evaluating the voltage ratios or, alternatively, by evaluating the switching state ratios of the electronic switching elements of the modules.

Optional regulation of the energy content, of the voltage ratios or of the switching state ratios of the power converter or of the phase module branch such that, in the quasi-stationary state, a setpoint value for the maximum value of the degree of modulation is ideally achieved precisely, wherein this setpoint value is ideally not exceeded even in the event of dynamic fluctuations.

The setpoint value for the maximum value of the degree of modulation may be constant or different in an operating point-specific manner. This setpoint value may for example be derived from a characteristic diagram or calculated by way of a polynomial.

The converter may optionally also be regulated without ascertaining module voltage values, phase module branch voltage values, module energies or phase module branch energies, which considerably simplifies the regulation, in particular in the case of systems to be newly developed.

REFERENCE SIGNS 1 multilevel power converter
5 first AC voltage terminal
7 second AC voltage terminal
9 third AC voltage terminal
10 phase module branch
10a first phase module branch
10b second phase module branch
10c third phase module branch
10d fourth phase module branch
10e fifth phase module branch
10f sixth phase module branch
16 first DC voltage terminal
17 second DC voltage terminal
200 multilevel power converter
304 first branch terminal
306 second branch terminal
310 module
312 inductor
400 module/half-bridge module
410 first electronic switching element
412 second electronic switching element
416 energy store/capacitor
418 third electronic switching element
420 fourth electronic switching element
422 first module terminal
425 second module terminal
500 module/full-bridge module
525 second module terminal
710 ascertainment device
715 maximum value former
720 regulation device
720' regulation device
730 driver
820 further regulation device
a(t) degree of modulation
$a_{max}(t)$ maximum value of the degree of modulation
$a_{max}s$ setpoint value for the maximum value of the degree of modulation
$I_{conv}$ phase module branch current
T period duration
$U_{conv}$ phase module branch voltage
$U_{SM}$ energy store voltage

The invention claimed is:

1. A method for controlling a modular multilevel power converter, the power converter having at least one phase module branch with a series circuit of modules and each of the modules including an energy storage device and a power semiconductor circuit containing electronic switching elements, the method comprising:

ascertaining a degree of modulation of the phase module branch, the degree of modulation describing a ratio between a phase module branch voltage output by the phase module branch and a maximum phase module branch voltage that is able to be output;

ascertaining a maximum value of the degree of modulation during a preselected time interval; and using a closed-loop control device to control the maximum value of the degree of modulation to a setpoint value for the maximum value of the degree of modulation.

2. The method according to claim 1, wherein the step of ascertaining the degree of modulation comprises:
   determining the phase module branch voltage output by the phase module branch and voltages of the energy storage devices of the individual modules of the phase module branch, by summing the voltages of the energy storage devices of the individual modules of the phase module branch and then calculating a ratio between the phase module branch voltage and a sum of the voltages of the energy storage devices of the modules of the phase module branch; or
   determining a number of modules of the phase module branch at which the voltage of the respective energy storage device actively contributes to the phase module branch voltage, and then calculating a ratio between the number of modules thus determined and the total number of modules present in the phase module branch.

3. The method according to claim 1, which comprises regulating the maximum value of the degree of modulation to the setpoint value for the maximum value of the degree of modulation by:
   driving the electronic switching elements of the modules of the phase module branch, in the event of an excessively high maximum value of the degree of modulation, such that the energy storage devices of the modules are charged on average to a higher voltage and, as a result, the maximum value of the degree of modulation drops; and/or
   driving the electronic switching elements of the modules of the phase module branch, in the event of an excessively low maximum value of the degree of modulation, such that the energy storage devices of the modules are charged on average to a lower voltage and, as a result, the maximum value of the degree of modulation increases.

4. The method according to claim 1, which comprises regulating the maximum value of the degree of modulation to the setpoint value for the maximum value of the degree of modulation by:
   converting the setpoint value for the maximum value of the degree of modulation into a setpoint energy amount for the modules of the phase module branch or into a setpoint sum of the voltages of the energy storage devices of the modules of the phase module branch; and
   driving the electronic switching elements of the modules such that the phase module branch is charged or discharged to the setpoint energy amount or the setpoint sum of the voltages of the energy storage devices of the modules.

5. The method according to claim 1, which comprises using a constant setpoint value for the maximum value of the degree of modulation or using a setpoint value for the maximum value of the degree of modulation that is dependent on an operating point, formed from the phase module branch voltage (Uconv) and a phase module branch current (Iconv) of the phase module branch.

6. The method according to claim 1, wherein the phase module branch includes surplus modules configured to replace modules that have failed during operation of the multilevel power converter, and wherein the surplus modules are also operational during an operation of the multilevel power converter.

7. The method according to claim 1, which comprises:
   ascertaining a common maximum value of the degree of modulation during the preselected time interval for multiple phase module branches of the multilevel power converter; and
   controlling the common maximum value of the degree of modulation to a setpoint value for the common maximum value of the degree of modulation by way of the closed-loop control device.

8. The method according to claim 1, which comprises using a setpoint value for the maximum value of the degree of modulation that is less than by a preselected safety margin.

9. An arrangement, comprising:
   a modular multilevel power converter having at least one phase module branch with a series circuit of modules, each of said modules having an energy storage device and a power semiconductor circuit containing electronic switching elements;
   an ascertainment device configured to ascertain a degree of modulation of said at least one phase module branch, wherein the degree of modulation describes a ratio between a phase module branch voltage output by said phase module branch and a maximum phase module branch voltage able to be output;
   a maximum value former configured to ascertain the maximum value of the degree of modulation during a preselected time interval; and
   a closed-loop control device configured to drive the maximum value of the degree of modulation to a setpoint value for the maximum value of the degree of modulation.

10. The arrangement according to claim 9, wherein said ascertainment device is configured:
    to determine a phase module branch voltage output by said phase module branch and voltages of said energy storage devices of the individual said modules of said phase module branch, to sum the voltages of said energy storage devices of the individual modules of said phase module branch and to then calculate a ratio between the phase module branch voltage and the sum of the voltages of said energy storage devices of said modules of said phase module branch; or
    to determine a number of modules of said phase module branch in which the voltage of the respective said energy storage device actively contributes to the phase module branch voltage, and to then calculate a ratio between the determined number of modules and the total number of modules present in said phase module branch.

11. The arrangement according to claim 9, wherein said closed-loop control device is configured to regulate the maximum value of the degree of modulation to the setpoint value for the maximum value of the degree of modulation by:
    initiating driving said electronic switching elements of said modules of said phase module branch, in the event of an excessively high maximum value of the degree of modulation, such that said energy storage devices of said modules are charged on average to a higher voltage and, as a result, the maximum value of the degree of modulation drops; and/or
    initiating driving said electronic switching elements of said modules of said phase module branch, in the event of an excessively low maximum value of the degree of modulation, such that said energy storage devices of said modules are charged on average to a lower voltage and, as a result, the maximum value of the degree of modulation increases.

12. The arrangement according to claim 9, wherein said closed-loop control device is configured to regulate the maximum value of the degree of modulation to the setpoint value for the maximum value of the degree of modulation by:
   converting the setpoint value for the maximum value of the degree of modulation into a setpoint energy amount for said modules of said phase module branch or a setpoint sum of the voltages of said energy storage devices of said modules of said phase module branch; and
   initiating driving of said electronic switching elements of said modules such that the phase module branch is charged or discharged to the setpoint energy amount or the setpoint sum of the voltages of said energy storage devices of said modules.

13. The arrangement according to claim 9, wherein said closed-loop control device is configured to use a constant setpoint value for the maximum value of the degree of modulation or to use a setpoint value that is dependent on an operating point, formed from the phase module branch voltage (Uconv) and a phase module branch current (Iconv), of said phase module branch for the maximum value of the degree of modulation.

14. The arrangement according to claim 9, wherein said phase module branch contains surplus modules that are configured to replace modules that have failed during an operation of said multilevel power converter, and said surplus modules are also operational during the operation of said multilevel power converter.

15. The arrangement according to claim 9, wherein:
   said maximum value former is configured to ascertain the common maximum value of the degree of modulation during the preselected time interval for multiple phase module branches of said multilevel power converter; and
   said closed-loop control device is configured to regulate the common maximum value of the degree of modulation to a setpoint value for the common maximum value of the degree of modulation.

16. The arrangement according to claim 9, wherein the setpoint value for the maximum value of the degree of modulation is less than 1 by a preselected safety margin.

17. The arrangement according to claim 9, wherein:
   each of said modules has a first electronic switching element, a second electronic switching element, and said energy storage device, and wherein said first electronic switching element, said second electronic switching element, and said energy storage device are connected in a half-bridge circuit; or
   each of said modules has a first electronic switching element, a second electronic switching element, a third electronic switching element, a fourth electronic switching element, and said energy storage device, and wherein said first electronic switching element, said second electronic switching element, said third electronic switching element, said fourth electronic switching element, and said energy storage device are connected in a full-bridge circuit.

* * * * *